2,831,578
WATER PURIFICATION PROCESS

Ernst Schwinn, Kulmbach, Germany, assignor to Forschungsgesellschaft der Wabag Wasserreinigungsbau m. b. H., Kulmbach, Germany No Drawing. Application April 19, 1957
Serial No. 653,731

21 Claims. (Cl. 210—65)

This invention relates to the removal of copper form water and waste water containing copper in the form of finely suspended and/or colloidally dissolved oxides and/or hydroxides or in the form of carbonates and/or bicarbonates.

The conventional way of removing heavy metal oxides and hydroxides which are generally insoluble in water, has been to separate the said compounds in settling and clarifying tanks or to filter the water through sand filters, candle filters, or through the rapid filters generally used in water conditioning. In rapid filters an alkaline filter material is used. Heavy metals present in the form of their salts have been separated from solutions in accordance with various generally known methods, e. g. according to the dementation process, electrolytic processes and others.

It is an object of the present invention to provide a process for the removal from water and waste water of copper oxide, hydroxide and/or truly dissolved copper carbonate and/or bicarbonate which the conventional processes have mostly not been able to completely remove from water and waste water.

It is a further object of this invention to provide a process for removing and recovering copper oxide and/or hydroxide from water and waste water containing the same in the form of a fine suspension or of a colloidal solution, and for separating copper carbonate and/or bicarbonate from water and waste water. Other objects will appear as the description of the invention proceeds.

It is to be understood that the present invention is not concerned with the reconditioning of pickling waste liquors containing considerable quantities of copper salts in solution.

It has now been found that it is possible to completely decopperize waste waters, e. g. those obtained from copper rolling mills and containing substantial quantities of copper sinter and oxides of copper in finely divided and colloidal form as well as minor amounts of carbonates and bicarbonates of copper, by loading a normal filter container, such as it is conventionally used for the conditioning of water, with an especially pretreated raw dolomite or similar neutral filter material having a definite particle size and simply filtering the copper containing waste water through this material.

Raw dolomite is preferred as a filter material. It is however within the scope of this invention to use other neutral filter materials. In this specification and claims, the term "neutral filter material" defines a filter material which, when treated wtih cold or warm water, does not effect an alteration of the pH of the water used for such treatment. Thus, the materials satisfying this condition are principally minerals having a high carbonate content.

The filter material should preferably have a particle size of about 1.0 to 1.5 mm.

According to one embodiment of the invention, the filter material is first impregnated with a dilute aqueous solution of a water-soluble copper salt such as copper sulphate or cuprous chloride. Other copper salts may be used for this purpose provided they are hydrolyzable and easily reducible by chemical reducing agents. The aqueous solution of the copper salt is preferably employed in a concentration of about 1% to 2% by weight, but it is to be understood that somewhat higher or lower concentrations may be used. The water used for the preparation of this solution should be clear, i. e. free from any suspended matter, and also free from compounds of iron and manganese. The impregnation of the filter material with the solution of the copper salt is effected by soaking the filter material in the solution at a temperature of about 40° to 45° C. for a period of about 2 to 3 hours, whereupon the filter material is washed with clear water, said water being free from iron and manganese compounds, until the wash water is substantially free from copper ions.

After the completion of the above-mentioned impregnation, a dilute aqueous solution of a reducing agent, such as hydrazine hydrate or formaldehyde, is pumped through the filter material at a temperature of about 40° to 50° C., preferably of about 40° to 45° C., and recycled through the filter material at the same temperature for a period of about 0.5 to 2 hours in order to chemically reduce the copper adsorbed by the filter material. A suitable concentration of the reducing agent used in this step is about 0.5 to 1.5% by weight. The filter material is then thoroughly washed with clear water at a temperature of about 40° to 50° C., preferably of about 40° to 45° C., to remove the excess of the reducing agent. In this washing step, it is, however, not necessary to completely remove the reducing agent from the filter material.

The water or waste water to be decopperized may then be passed through the thus pretreated filter material.

According to another embodiment of the invention, in cases where the water or waste water to be treated has a high copper content of, say, more than about 50 mg. per liter, the impregnation of the filter material with copper may be effected by using the said water or waste water itself as the impregnating solution instead of using a solution of a copper salt especially prepared for this purpose as described above. In this case, the impregnation of the filter material with the water or waste water relatively rich in copper is preferably carried out for a prolonged period of time at a temperature of about 70° to 80° C., whereby the filter material takes up a certain quantity of the copper salt. This operation may be followed up by the reduction process as described above.

In practice, the process of this invention is carried out as follows:

The waste water is first passed into the inlet compartment of a settling and clarifying unit where it is thoroughly aerated. The aerated waste water leaving the inlet compartment is passed into a settling and clarifying tank where a large part of the copper separates out in the form of copper oxide and hydroxide. The effluent of this clarifying unit contains finely suspended and colloidally dissolved copper oxide and hydroxide only as well as the total amount of truly dissolved copper salts.

The total amount of copper—dissolved as well as suspended—still present in the water or waste water after this pretreatment is completely separated therefrom by the subsequent filtration of the pretreated water or waste water through a filter containing the filter material pretreated as described above. The pretreated filter material having a particle size of about 1.0 to 1.5 mm. is arranged in a filter container as a layer having a vertical height of about 2 to 3 meters and the water or waste water to be filtered is passed through the filter material at a rate of about 10 to 20 meters per hour.

It is to be noted that the filtering velocity and the particle size of the filter material should not substantially exceed the values mentioned above. At a substantially higher filtering velocity as well as when using filter material having a substantially larger particle size, the contact time between the filter particles and the water would be insufficient to completely decopperize the water.

Complete separation of the copper is thus obtained.

Since, by the process of removal of the copper, the filter material silts up, it is necessary to wash the filter material as soon as a predetermined resistance to the passage of liquid has been reached. The muddy water obtained by this washing operation is recycled to the inlet compartment of the settling and clarifying unit. Thus the copper retained by the filter unit may be completely recovered.

After the filter material has been washed free of silt, the filter is again put into operation and the filtration process re-started. No regeneration of the filter material will be required during any subsequent filtering operations.

The invention will be more fully understood by reference to the following examples without, however, being limited to the modifications described therein.

*Example I*

Raw dolomite having a particle size of about 1.0 to 1.5 mm. was soaked for about three hours at about 48° C. in a solution containing about 1.5% by weight of cuprous chloride dissolved in clear water free of suspended matter, iron and manganese. After the 3 hours' soaking period the treated dolomite was thoroughly washed with clear, iron- and manganese-free water until the wash water was free from cuprous chloride. An aqueous solution containing about 1.5% by weight of hydrazine hydrate was then recycled, at about 45° C., through the treated dolomite by means of a pump for a period of about two hours, whereupon the excess of hydrazine hydrate was washed out of the dolomite by means of clear water at about 45° C.

A rolling mill waste water rich in copper and containing about 400 mg. of copper sinter and copper oxides per liter and 20 mg. of truly dissolved copper per liter, a large part of the said copper sinter and copper oxide being present in the waste water in a finely dispersed state and part being present in colloidal solution, was thoroughly aerated and then passed into a settling and clarifying tank. After a residence time of about 30 minutes the water was withdrawn from the settling and clarifying tank and passed at a temperature of about 40° C. through a filter loaded with the raw dolomite pretreated as described above. The height of the layer of dolomite was about 2 meters and the filter was operated at a filtering rate of about 20 meters per hour.

Before entering the filter, the waste water contained about 80 mg. of copper sinter and copper oxide per liter and about 20 mg. of truly dissolved copper per liter. After the filter had been allowed a relatively short starting-up period, the filtrate was completely free of any suspended and dissolved copper.

*Example II*

A waste water containing about 300 mg. of copper sinter and copper oxide per liter as a very fine dispersion and about 5 mg. of truly dissolved copper per liter was treated according to Example I with the exception that the temperature during the filtering operation was about 15° C. The effect was the same. The filtrate was completely free of copper. Even traces of copper could no longer be detected. Thus it will be seen that the filtering temperature does not influence the process of the invention.

While certain representative embodiments and details have been shown for the purpose of illustrating the invention, it will be apparent to those skilled in this art that various changes and modifications may be made therein without departing from the spirit or scope of the invention.

What is claimed is:

1. The process of removing copper from copper-containing water and waste water which comprises passing said water through a layer of a particulate neutral filter material, said filter material having been pretreated with a dilute aqueous solution of a copper salt and subsequently with a dilute aqueous solution of a reducing agent.

2. The process of claim 1 wherein said particulate neutral filter material is raw dolomite.

3. The process of claim 1 wherein said particulate neutral filter material has a particle size of about 1.0 to about 1.5 mm.

4. The process of claim 1 wherein the said copper salt is copper sulphate.

5. The process of claim 1 wherein the said copper salt is cuprous chloride.

6. The process of claim 1 wherein the concentration of the said dilute aqueous solution of a copper salt is about 1% to about 2% by weight.

7. The process of claim 1 wherein the said reducing agent is hydrazine hydrate.

8. The process of claim 1 wherein the said reducing agent is formaldehyde.

9. The process of claim 1 wherein the concentration of the said dilute aqueous solution of a reducing agent is about 0.5% to about 1.5% by weight.

10. The process of removing copper from copper-containing water and waste water which comprises soaking a particulate neutral filter material having a particle size of about 1.0 mm. to about 1.5 mm. in a dilute aqueous solution of a hydrolyzable and reducible copper salt at an elevated temperature of about 40° to about 45° C. for a period of about 2 to about 3 hours, washing the said filter material with water to remove any excess of the said copper salt solution, thereafter treating the said filter material with a dilute aqueous solution of a reducing agent, capable of reducing said copper salt to metallic copper, at an elevated temperature of about 40° to about 50° C. for a period of about 0.5 hour to about 2 hours, washing the treated filter material with water at a temperature of about 40° to about 50° C. to remove any excess of the said reducing agent therefrom, and filtering the said copper-containing water through a layer of the treated filter material to substantially remove any dissolved and suspended copper contained therein.

11. The process of claim 10 wherein said particulate neutral filter material is raw dolomite.

12. The process of claim 10 wherein the vertical height of the said layer of filter material is about 2 to about 3 meters and the copper-containing water is passed through the said layer at a rate of about 10 meters to about 20 meters per hour.

13. The process of removing copper from copper-containing water and waste water which comprises thoroughly aerating said copper-containing water, passing the aerated water into a settling zone to remove by gravity a substantial portion of the copper content, and passing the effluent from the said settling zone through a layer of a particulate neutral filter material, said filter material having been pretreated with a dilute aqueous solution of a copper salt and subsequently with a dilute aqueous solution of a reducing agent capable of reducing said copper salt to metallic copper.

14. The process of claim 13 wherein said particulate neutral filter material is raw dolomite.

15. The process of claim 13 wherein said particulate neutral filter material has a particle size of about 1.0 mm. to about 1.5 mm.

16. The process of removing copper from copper-containing water and waste water which comprises soaking a particulate neutral filter material having a particle size in the range of about 1.0 mm. to about 1.5 mm. in a dilute aqueous solution of a hydrolyzable and reducible copper salt at an elevated temperature of about 40° to about 45° C. for a period of about 2 to about 3 hours, washing the said filter material with water, said water being free of iron, manganese and suspended matter to remove any excess of the said copper salt solution, thereafter treating the said filter material with a dilute aqueous solution of a reducing agent, capable of reducing said copper salt to metallic copper, at an elevated temperature of about 40° to about 50° C. for a period of about 0.5 to about 2 hours, washing the treated filter material with water at a temperature of about 40° to about 50° C. to remove any excess of the said reducing agent therefrom, thoroughly aerating said copper-containing water, passing the aerated water into a settling zone to remove by gravity a substantial portion of the copper content, and passing the effluent from the said settling zone through a layer of the treated filter material.

17. The process of claim 16 wherein said particulate neutral filter material is raw dolomite.

18. The process of claim 16 wherein the vertical height of the said layer of filter material is about 2 to about 3 meters and the copper-containing water is passed through the said layer at a rate of about 10 meters to about 20 meters per hour.

19. The process of removing copper from water and waste water containing more than about 50 mg. copper per liter which comprises passing the said copper-containing water through a layer of a particulate neutral filter material having a particle size within the range of about 1.0 mm. to about 1.5 mm. at a temperature of about 70° to about 80° C. for a prolonged period of time, washing the said filter material with water, thereafter treating the said filter material with a dilute aqueous solution of a reducing agent, capable of reducing copper ions to metallic copper, at an elevated temperature of about 40° to about 50° C. for a period of about 0.5 to about 2 hours, washing the treated filter material with water at a temperature of about 40° to about 50° C. to remove any excess of the said reducing agent therefrom, and filtering the said copper-containing water through the said treated filter material to substantially remove any dissolved and suspended copper contained therein.

20. The process of claim 19 wherein said particulate neutral filter material is raw dolomite.

21. The water purification process substantially as described.

No references cited.